(12) United States Patent
Parry-Barwick et al.

(10) Patent No.: US 11,687,348 B2
(45) Date of Patent: Jun. 27, 2023

(54) INTELLIGENT LAUNCH OF APPLICATIONS

(71) Applicant: VMware, Inc., Palo Alto, CA (US)

(72) Inventors: Stephen Jonathan Parry-Barwick, Sydney (AU); Lili Wang, Sydney (AU); Hua Fiona Zhang, Sydney (AU); Maria Matelle Sy, Sydney (AU)

(73) Assignee: VMWARE, INC., Palo Alto, CA (US)

( * ) Notice: Subject to any disclaimer, the term of this patent is extended or adjusted under 35 U.S.C. 154(b) by 135 days.

(21) Appl. No.: 17/068,076

(22) Filed: Oct. 12, 2020

(65) Prior Publication Data

US 2022/0113987 A1 Apr. 14, 2022

(51) Int. Cl.
*G06F 9/445* (2018.01)
*G06F 9/451* (2018.01)
*G06F 21/62* (2013.01)
*G06F 21/51* (2013.01)
*G06F 3/0482* (2013.01)

(52) U.S. Cl.
CPC .......... *G06F 9/4451* (2013.01); *G06F 3/0482* (2013.01); *G06F 9/452* (2018.02); *G06F 21/51* (2013.01); *G06F 21/629* (2013.01); *G06F 2221/2141* (2013.01)

(58) Field of Classification Search
CPC ...... G06F 9/452; G06F 9/4451; G06F 21/629; G06F 2221/2141; G06F 21/51
See application file for complete search history.

(56) References Cited

U.S. PATENT DOCUMENTS

| | | | |
|---|---|---|---|
| 2005/0283441 A1* | 12/2005 | Deshpande | ........... H04L 63/083 705/64 |
| 2013/0290858 A1* | 10/2013 | Beveridge | ............... H04L 67/42 715/740 |
| 2014/0109209 A1* | 4/2014 | Haynes | ................... H04L 63/08 726/7 |
| 2017/0094057 A1* | 3/2017 | Naiga | ..................... H04L 67/34 |
| 2018/0295033 A1* | 10/2018 | Vladimirskiy | ........ G06F 9/5077 |
| 2019/0245848 A1* | 8/2019 | Divoux | ............... H04L 63/0815 |
| 2020/0374284 A1* | 11/2020 | Suresh | ................ H04L 63/0853 |

* cited by examiner

*Primary Examiner* — Andrea C Leggett
(74) *Attorney, Agent, or Firm* — Thomas Horstemeyer, LLP (57) ABSTRACT

Disclosed are various examples of intelligent provisioning management. An application launch is detected from a client device. An application launch policy is identified. Device parameters are identified and mapped to an application access type according to the application launch policy. The application is accessed according to the application access type.

20 Claims, 4 Drawing Sheets

INTELLIGENT LAUNCH OF APPLICATIONS

BACKGROUND

Companies, organizations, and other enterprises can provide access to an application in many different ways. Management services utilized by the enterprise can assist an application administrator delivering applications to end users. To enable application access on a local device, the application can be installed to the local device. In other cases, a virtual desktop infrastructure (VDI) can include the application. In further situations, the application can be provided using a remote desktop session host (RDSH). There are yet further ways to provide application access, including web applications, published applications, and others. Each access type can have benefits and drawbacks.

However, existing technologies can require an enterprise or an information technology professional to choose one way to provide an application, and ultimately deal with the benefits and drawbacks. This can result in suboptimal or inefficient application access times and a negative user experience, depending on network connectivity, machine usage, location, and other aspects. While one solution could be to provide a user with all the ways to access the application, this can result in unnecessary licensing costs as well as data usage. However, end users often do not understand the benefits and drawbacks of various application access types. End users do not have knowledge of the machine performance. As a result, there is a need for better solutions for application access.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to intelligent launch of applications. Enterprises can deliver applications to end users in a number of ways. To enable application access on a client device, the application can be installed to the device. In other cases, a virtual desktop infrastructure (VDI) can include the application. In further situations, the application can be provided using a remote desktop session host (RDSH). There are yet further ways to provide application access, including web applications, published applications, thin-wrapped applications and others. Each access type can have benefits and drawbacks.

However, existing technologies can require an enterprise or an information technology professional to choose a single way to provide an application to a user or a device. This can result in suboptimal or inefficient application access times and a negative user experience, depending on network connectivity, machine usage, machine configuration, location, and other aspects. While one solution could be to provide a user with all the ways to access the application, this can result in unnecessary licensing costs as well as data usage. However, end users often do not understand the benefits and drawbacks of various application access types. End users do not have knowledge of the machine performance. As a result, there is a need for better solutions for application access.

The present disclosure provides mechanisms that provide intelligent launch of applications by intercepting an application launch and enabling delivery of the application to the end user according to a best application access type at the time of the application launch. For example, once the application launch is intercepted, the mechanisms can perform a policy-driven mapping of static and dynamic device parameters to an application access type, and provide access to the application according to the identified application access type. This can also include a Just-In-Time Management Platform (IMP) paradigm where applications and profiles can be provided to a user or group of users at the time they are needed and according to existing conditions rather than being fixed at design time. Intelligent launch of applications can take input from device parameters including network latency, network bandwidth, network location or name, application profiles, client machine performance, and map these parameters with policy rules to identify an application access type. Application access types can refer to ways to deliver the application. For example, the management service 115 can include a number of ways to provide access to a particular application, including locally installed access, RDSH access, VDI access, web app access, mountable app volume access, and others. Some of these access types can be more granularly specified.

By providing an Application Launch Agent with an Application Launch Interceptor (ALI), when an application icon is clicked, the platform can decide how to deliver the application using any combination of a currently locally installed version, an installable version from an application volume, a thin-wrapped executable version from an application volume, a VDI published application, a VDI desktop application, a locally installed version launched from a VDI desktop session, or a RDSH application. A version of an application can correspond to an instance or example of the application installed or otherwise stored on a data store of a particular device, server, or mountable volume. In other words, each application access type can correspond to a separately stored instance or example of the application with respect to the other application access types indicated in an application launch policy.

Figure 1:
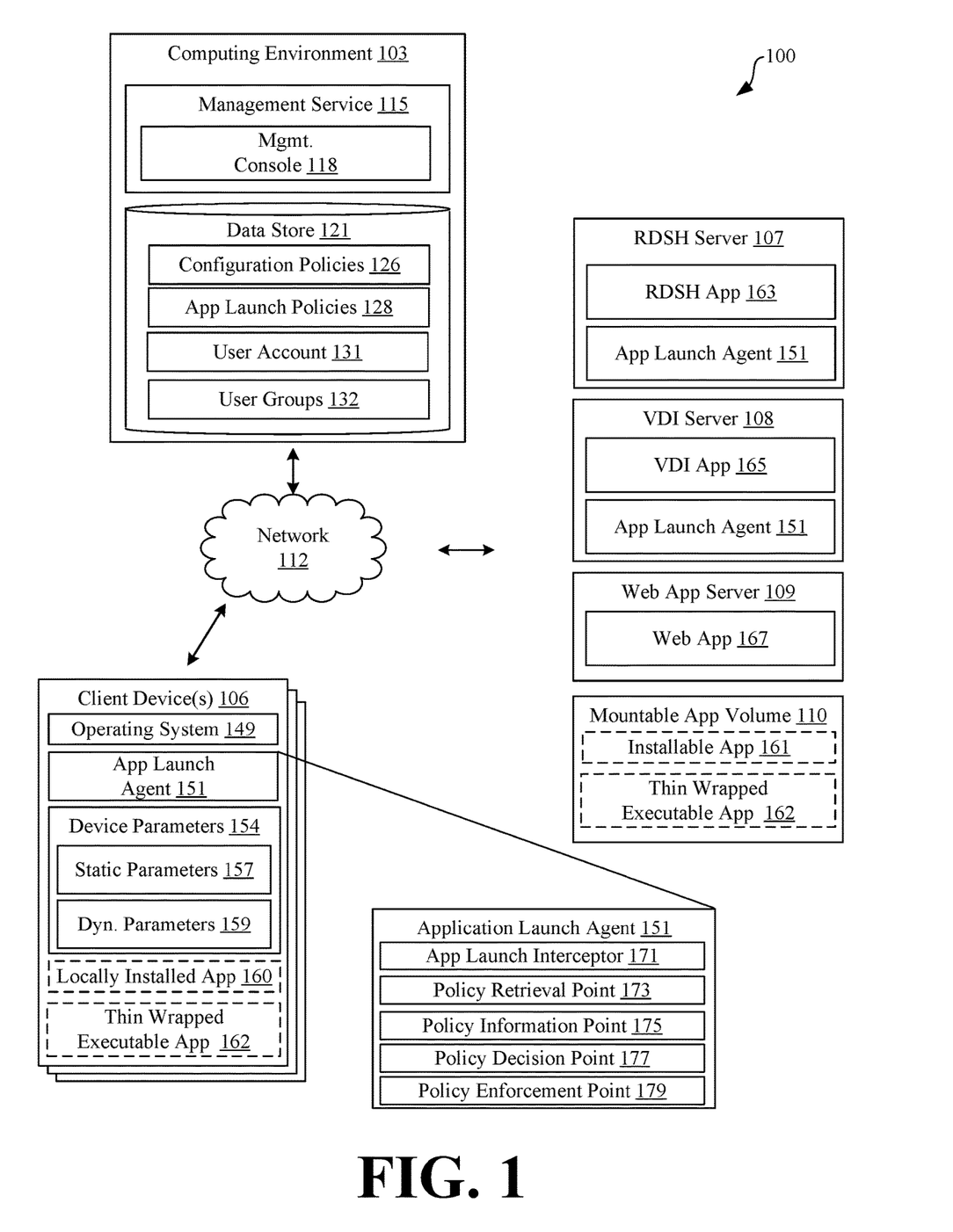
FIG. 1 is a drawing of a networked environment including components that provide application access for intelligent launch of applications, according to the present disclosure.

With reference to FIG. 1, shown is an example of a networked environment 100. The networked environment 100 can include a computing environment 103, one or more client devices 106, a RDSH server 107, a VDI server 108, a web application server 109, and a mountable application volume or server 110 in communication with one another over a network 112.

The network 112 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include, for example, a server computer, or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 112, the computing environment 103 can be described as a remote computing environment 103.

Various applications can be executed in the computing environment 103. For example, a management service 115 that includes a management console 118 as well as other applications, may be executed in the computing environment 103. Also, various data is stored in a data store 121 that is accessible to the computing environment 103. The data store 121 may be representative of a plurality of data stores 121, which can include relational databases, object-oriented databases, hierarchical databases, hash tables or similar key-value data stores, as well as other data storage applications or data structures. The data stored in the data store 121 is associated with the operation of the various applications or functional entities described below This data can include one or more device records, configuration policies 126, application launch policies 128, user groups 132, user accounts 131 that can be assigned to device records and user groups 132, as well as potentially other data.

The management service 115 can be executed to oversee the operation of client devices 106 enrolled with the management service 115. In some examples, an enterprise, such as a company, organization, or other entity, can operate the management service 115 to oversee or manage the operation of the client devices 106 of its employees, contractors, customers, or other users having accounts with the enterprise. The management service 115 can further cause device records, configuration policies 126, application launch policies 128, user groups 132, user accounts 131 to be created, modified, or removed from the data store 121.

The user groups 132 can refer to a group of user accounts 131 with the management service 115. User groups can be created by an administrator of the management service such that a batch of client devices 106 can be configured according to common settings. For instance, an enterprise can create a user group 132 for the marketing department and the sales department, where client devices 106 in the marketing department are configured differently from the client devices 106 in the sales department.

In various examples, the management service 115 can perform various compliance actions in response to determining that the status response is untrustworthy. Compliance actions can include, for example, generating and sending a notification of the compromise to an administrator of the enterprise environment, causing the client device 106 to be wiped or otherwise cleaned of various software or settings (e.g., reset to factory settings), restricting access to one or more applications, restricting access to different types of data (e.g., enterprise data), or other actions that can ensure the safety of the enterprise with respect to a compromised device.

The management console 118 provides an interface for client devices 106 to interact with and control the operation of the management service 115. Administrators and other users can interact with the management console 118. For example, the management console 118 can include a web server that generates one or more web pages that can be displayed on the client device 106. An administrative user can interact with the web pages served by the management console 118. For instance, the administrative user could use the management console 118 to define configuration policies 126, device performance ratings, and/or other actions. In addition, the management console 118 can also provide a public application programming interface (API) that is accessible across the network 112. Standalone applications installed on a client device 106 can call or otherwise invoke one or more functions provided by the API to programmatically control the operation of the management service 115.

The client device 106 is representative of one or more client devices that may be connected to the network 112. Examples of client devices 106 include processor-based systems, such as desktop computers, laptop computers, a personal digital assistant, a cellular telephone, a smartphone, a tablet computer system, smart speakers or similar headless devices, or any other device with like capability. The client device 106 can also be equipped with networking capability or networking interfaces, including a localized networking or communication capability, such as a near-field communication (NFC) capability, radio-frequency identification (RFID), read or write capability, or other localized communication capability.

The RDSH server 107 can include a server computer, or any other system providing computing capability. Alternatively, the RDSH server 107 can include a plurality of computing devices that are arranged, for example, in one or more server banks, computer banks, or other arrangements. The RDSH server 107 can provide server-operating-system-based sessions to provide desktops and applications that can support multiple users per virtual machine. The virtual machine can include the RDSH application 163, the application launch agent 151, an operating system, and other applications. The RDSH server 107 can provide access to any number of RDSH applications 163 as software-as-a service (SaaS) or platform-as a service (PaaS). The RDSH server 107 can also provide infrastructure-as-a-service (IaaS) where a RDSH desktop operating system is also provided for remote access by a client device 106. The client device 106 can access a RDSH desktop operating system and open a RDSH application 163 within that RDSH desktop. However, the client device 106 can alternatively be running a local operating system 149 or a VDI operating system, and still access the RDSH application 163. RDSH servers 107 can host desktops and applications that can be accessed remotely over the network 112 by users of the client devices 106.

The RDSH server 107 can enable quick update roll-outs because the management service 115 can provision the RDSH server 107 rather than numerous client devices 106. The RDSH server 107 can allow multiple client devices 106 to connect to access session-based desktops, published applications and server resources. The RDSH server 107 further allows a client device 106 to access applications and desktop operating systems that are unsupported or are otherwise typically not installable on that particular client device 106. The RDSH application 163 can be associated with a RDSH access type. The RDSH application 163 access type can also be more granularly specified as RDSH SaaS access type, RDSH PaaS access type, and RDSH IaaS access type.

The VDI server 108 can include a server computer, or any other system providing computing capability. Alternatively, the VDI server 108 can include a plurality of computing devices that are arranged, for example, in one or more server banks, computer banks, or other arrangements. The VDI server 108 can provide operating-system-based desktops and applications that can generally include a single user per virtual machine. The virtual machine can include the VDI applications 165, the application launch agent 151, an operating system, and other applications. The VDI server 108 can provide SaaS or PaaS access to VDI applications 165. The VDI server 108 can also be capable of providing IaaS access to VDI applications 165, where a VDI desktop operating system is also provided for remote access by a client device 106. The client device 106 can access a VDI desktop operating system and open a VDI application 165 within that VDI desktop. However, the client device 106 can alternatively be running a local operating system 149 or a RDSH operating system, and still access the VDI application 165. The VDI server 108 can provide access to any number of VDI applications 165. The VDI application 166 can be associated with a VDI access type. The VDI application 165 access type can also be more granularly specified as VDI SaaS access type, VDI PaaS access type, and VDI IaaS access type.

The web application server 109 can include a server computer, or any other system providing computing capability. Alternatively, the web application server 109 can include a plurality of computing devices that are arranged, for example, in one or more server banks, computer banks, or other arrangements. The web application server 109 can include the web application 167. The web application 167 can refer to an instance or type of application that is accessible through a web browser user interface. The web application server 109 can provide access to any number of web applications 167. The web application 167 can be associated with a web application 167 access type.

The mountable application volume 110 can include a mountable volume provided using a server computer or any other system providing computing capability, including a plurality of computing devices that are arranged, for example, in one or more server banks, computer banks, or other arrangements. The mountable application volume 110 can provide access to a standard installable application 161 for download and installation. The standard installable application 161 can be served and provided if a locally installed access type is identified but the application is not currently installed on the client device 106. This installable application 161, once installed, can be referred to as the locally installed application 160. The mountable application volume 110 can provide access to a thin-wrapped executable application 162.

The thin-wrapped executable application 162 can refer to a portable application executable that is a wrapped instance of a conventional application. The thin-wrapped executable application 162 does not need to be installed in a traditional sense. The thin-wrapped executable application 162 can be executed using client devices 106 that have incompatible hardware that cannot execute the conventional application. Further, the thin-wrapped executable application 162 can include prerequisite software or operating systems components so that it is executable using client devices 106 that lack these prerequisites. For example, the thin-wrapped executable application 162 can enable execution of a legacy web application by providing a legacy web browser, where the legacy web application is incompatible with the current web browser on the client device 106, RDSH server 107, or VDI server 108.

The client device 106 can include an operating system 149, application launch agent 151, device parameters 154, a locally installed application 160, a thin-wrapped executable application 162, and other components. The operating system 149 can be configured to execute various client applications. Examples of operating systems 149 include MICROSOFT WINDOWS®, APPLE macOS®, APPLE iOS®, GOOGLE ANDROID®, and various distributions of Linux. The client applications can include web browsers, enterprise applications, social networking applications, word processors, spreadsheet applications, and media viewing applications. Functionalities described with respect to the operating system 149 of the client device 106 can alternatively be performed by a server operating system of the RDSH server 107, or a client operating system of the VDI server 108. The client device 106 can include a RDSH client application that can access the client operating system of the RDSH server 107. The client device 106 can include a VDI client application that can access the client operating system of the VDI server 108.

The device parameters 154 can include static parameters 157 and dynamic parameters 159. Static parameters 157 can refer to parameters that are not subject to change based on usage of the client device 106 and usage of a networked environment 100. These static parameters 157 can be items related to the client device 106 or the user account 131 associated with the client device 106. For example, the physical memory or access memory of the client device 106, hard disk or storage capacity of the client device, and processor speed or processor type can be static parameters 157. If an application requires 16 GB of memory to run locally on a client device that only has 4 GB configured, an application launch policy 128 can specify to start a RDSH session for a RDSH application 163 rather than provisioning an installable application 161 or a thin-wrapped executable application 162 to provide application access.

More generally, the application launch policy 128 can specify minimum, desirable, and other threshold groups of static parameters 157 that can be weighted or otherwise considered in order to determine an optimal application access type. Table 1 shows a simplified pseudo XML format, including a username or account name, network name of a network to which the client device 106 is connected, an IPv4 address, an IPv6 address, geographic or GPS location, user group 132, and others. Static parameters 157 are parameters that generally do not change as a result of device performance or capacity usage, and so they are generally untrendable over a period of time as a performance indicator. While static parameters 157 do not change as a result of device usage, they can change periodically as a result of configuration changes, location changes, network connection changes, and other changes.

TABLE 1

```
<StaticParameters>
    <parameter>user name</parameter>
    <parameter>network name</parameter>
    <parameter>IPv4 address</parameter>
    <parameter>IPv6 address</parameter>
</StaticParameters>
```

In some cases, static parameters 157 such as network name or IP address can indicate a location of the client device 106. Some applications can perform better if in close proximity to a database or other back end that is frequently accessed by the application. As a result, the application launch policy 128 can weigh network name-based, geographical-location-based, and network-latency-based proximity to the back end in order to determine the application access type. An application access type can correspond to a separately stored instance or example of the application with respect to the other application access types indicated in an application launch policy 128.

Dynamic parameters 159 can refer to parameters that are subject to change based on usage of the client device 106 and usage of a networked environment 100. These dynamic parameters 159 can be dynamic or trendable over a period of time as a dynamic performance indicator. Dynamic parameters 159 can include CPU usage, memory usage, disk latency, network latency, and others. At any one moment in time these dynamic parameters 159 can fluctuate dramatically as a result of device usage and network conditions, so taking a snapshot is suboptimal. As a result, individual dynamic parameters 159 can be collected at specified intervals (e.g., seconds) and durations or windows of time to combine values. The dynamic parameters 159 can be trended over time to give a single figure or metric. Table 2 shows a simplified pseudo XML format that indicates various parameters to collect at specified intervals and trend over specified durations.

TABLE 2

```
<DynamicParameters>
    <cpu>
        <Collection>
            <interval>2</interval>
            <duration>15</duration>
        <Collection>
    </cpu>
    <memory>
        <Collection>
            <interval>1</interval>
            <duration>15</duration>
        <Collection>
    </memory>
    <network>
        <Collection>
            <interval>1</interval>
            <duration>10</duration>
        <Collection>
    </network>
</DynamicParameters>
```

The application launch agent 151 can have components including an application launch interceptor 171, a policy retrieval point 173, a policy information point 175, a policy decision point 177, and a policy enforcement point 179. The application launch interceptor 171 of the application launch agent 151 can intercept the launch of an application by a user of the client device 106. For example, a user can select an icon for the application through a desktop environment in order to open and access a particular application. The icon can be a standard application icon which, in typical usage, directly causes the operating system to open the locally installed application, the RDSH application 163, or the VDI application 165. However, the application launch agent 151 can detect the application launch and perform a series of operations to dynamically determine an application access type that matches the current device parameters 154 at the time of launch.

The application launch interceptor 171 can intercept a launch of a locally installed application 160 through a desktop environment of the operating system 149; intercept a launch of a RDSH application 163 through a desktop environment provided by the RDSH server 107; or intercept a launch of a VDI application 165 through a desktop environment provided by the VDI server 108.

The application launch interceptor 171 can intercept calls to the operation system 149 when an application is launched. Hooking can be utilized to check for the application process identifier (PID) or another identifier of a particular application corresponding to a particular access type. This can be invoked by the user clicking on an icon in a start menu, their desktop or elsewhere, or based on a default application file type association. Once the PID is identified, the application launch agent 151 can stop the process with the PID, execute checks to select the application access type, and start the selected process with a new target PID.

Alternatively, the application launch agent 151 can modify a default application so that the application launch interceptor 171 is the application of choice. This can correspond to a default application to open a file type or extension, or a default application to provide a specified functionality such as text processing, image viewing, or internet browsing access.

In some cases, the analysis and identification of application access type can run as a background process rather than being invoked in response to application launch. The application launch agent 151 can include a background process that manages a default application list for each process type or functionality. The background process can continually or periodically update the list of default applications in response to detected changes in the device parameters 154, as well as changes to configuration policies 126 and application launch policies 128. This can enable the selected application access type to be launched without any delay as the associated application is already defined at launch time.

As an application launch is detected, the policy decision point 177 is contacted to decide which application should be launched. If the application launch type associated with the original icon selection (e.g., locally installed application 160, etc.) is returned, then the result can be a pass-through operation to the operation system 149 to launch the locally installed application 160. In the case where there is a policy to use a different application access type specifying another instance of the application, the access information can be returned to the application launch interceptor 171 and the appropriate instance of the application launched. Access information can include a network endpoint and other application launch instructions associated with a selected one of the RDSH application 163, VDI application 165, web application 167, or mountable application volume 110. In some cases, this can also include download and/or installation instructions for the thin-wrapped executable application 162 or the installable application 161.

The policy retrieval point 173 of the application launch agent 151 can request policies at startup of the client device 106, start of the application launch agent 151, at user login with a remote desktop provided by the RDSH server 107 or VDI server 108, and at regular intervals. The policy retrieval point 173 of the application launch agent 151 can request the configuration policies 126 and application launch policies 128 associated with the client device 106, a user account 131, or a user group 132 which can be requested from the management service 115. The configuration policies 126 and launch policies 128 can be stored along with a timestamp so that only new and updated polices are retrieved. If there was a delay in the download of the policy data a default policy can be used if any applications are launched prior to the user- or device-specific policies are retrieved.

The policy information point 175 of the application launch agent 151 can detect, collect, and monitor device parameters 154 and calculate performance ratings according to a configuration policy 126. This can enable the application launch agent 151 to ultimately make application launch decisions according to application launch policies 128. This can include a plugin architecture that can utilize a markup language or another syntax for XML or other types of additional plugins that can easily be added to extend the platform.

In order to detect, collect, and monitor device parameters 154, the policy information point 175 can perform calls to the operating system 149 that can return certain device parameters 154. Some static parameters can be identified by reading a registry key. The policy information point 175 can utilize common information model (CIM) to identify device parameters 154. For WINDOWS® operating systems 149, the policy information point 175 can utilize windows management instrumentation (WMI) to identify device parameters 154. In some examples, a VDI tool can collect device parameters 154 for VDI deployments, and a RDSH tool can collect device parameters 154 for RDSH deployments.

The information collected can be broken down by the items described in the configuration policy 126 retrieved from the server. Information that is identified as a static parameter 157 can be retrieved, stored, and refreshed according to a configurable static parameter refresh rate. In some cases, static information can be refreshed at a configurable rate such as a specified number of minutes, hours, days, or based on a longer-term trigger event like device restart. Dynamic parameters 159 can be collected a configurable rate such as a specified number of seconds, and averaged or trended over a specified rolling window or duration. By collecting the raw values of device parameters 154 allows them to be easily combined according to the configuration policies 126 so that at the time of application launch they can be quickly retrieved without needing any complex time-consuming calculations at launch time.

A policy decision point 177 can take in the application launch policy 128 from the policy retrieval point 173 and the multiple data sources based on the device parameters 154 from the policy information point 175. The policy decision point 177 can then evaluate the application launch policy 128 to identify an application access type. The application access types can in some cases be associated with a locally installed application 160, a RDSH application 163, a VDI application 165, a web application 167, an installable application 161, or a thin-wrapped executable application 162.

A policy enforcement point 179 can implement application access instructions. Once a decision has been returned with the application access type or specified application instance, the policy enforcement point 179 can pass appropriate information back to the operation system 149 or the appropriate remote desktop operating system to carry out application access. While the application launch interceptor 171, policy retrieval point 173, policy information point 175, policy decision point 177, and policy enforcement point 179 can be discussed separately, these components can all be instructions implemented by the application launch agent 151 or another agent application associated with the management service 115.

For example, in order to access a RDSH application 163, the policy enforcement point 179 can directly call a RDSH client application. The RDSH client application can include a URL interface or other interface that accesses the RDSH server 107. The URL interface can launch the RDSH application 163 using command line passing. The access information can include instructions to call or launch the RDSH client application with RDSH command line arguments or other commands to access the RDSH application 163 through the RDSH client application.

In order to access a VDI application 165, the policy enforcement point 179 can directly call a VDI client application. The VDI client application can include a URL interface or other interface that accesses the VDI server 108. The access information can include instructions to call or launch a VDI client application with VDI command line arguments or other commands to access the VDI application 165 through the VDI client application.

In order to access the web application 167, the policy enforcement point 179 can launch a local browser application of the client device 109 with a URL of the web application 167. The access information can include instructions to call or launch a particular browser application to the URL of the web application 167.

In order to access the locally installed application 160, the policy enforcement point 179 can pass a system call such as load or execute to the operating system 149. The access information can include the system call and memory location or directory path of the locally installed application 160. In order to access the thin wrapped executable application 162, the policy enforcement point 179 can pass a system call such as load or execute to the operating system 149. The access information can include the system call and memory location or directory path of the thin wrapped executable application 162. The thin wrapped executable application 162 can be located and executed from the mountable application volume 110 or locally from a data store of the client device 106.

The application launch policies 128 can utilize configuration policies 126, user groups 132, and device parameters 154 to identify the optimal application access type. An application access type can correspond to an instance, instance, or type of the application. The application launch policies 128 can map these factors to instructions to access the instance, instance, or type of the application from a specified device, server, or network location. The application access type can correspond to instructions to access a specified instance of the application from a specified device, server, or network location. A user account 131 with the management service can be identified based on the client device 106 or credentials used to log in to the client device 106, the RDSH server 107, the VDI server 108, or the computing environment 103. A particular user account 131 or user group 132 may have access to a subset of the available application access types. Also, a particular application launch policy 128 can be identified and provided to the client device 106, RDSH server 107, or VDI server 108 according to the user account 131 or user group 132. The application launch policy 128 can be account or user group 132 specific, so that it does not map the device parameters 154 to an application access type unavailable to the account or user group 132. Aspects of design and implementation of the application launch policies 128 are discussed further below.

Figure 2:
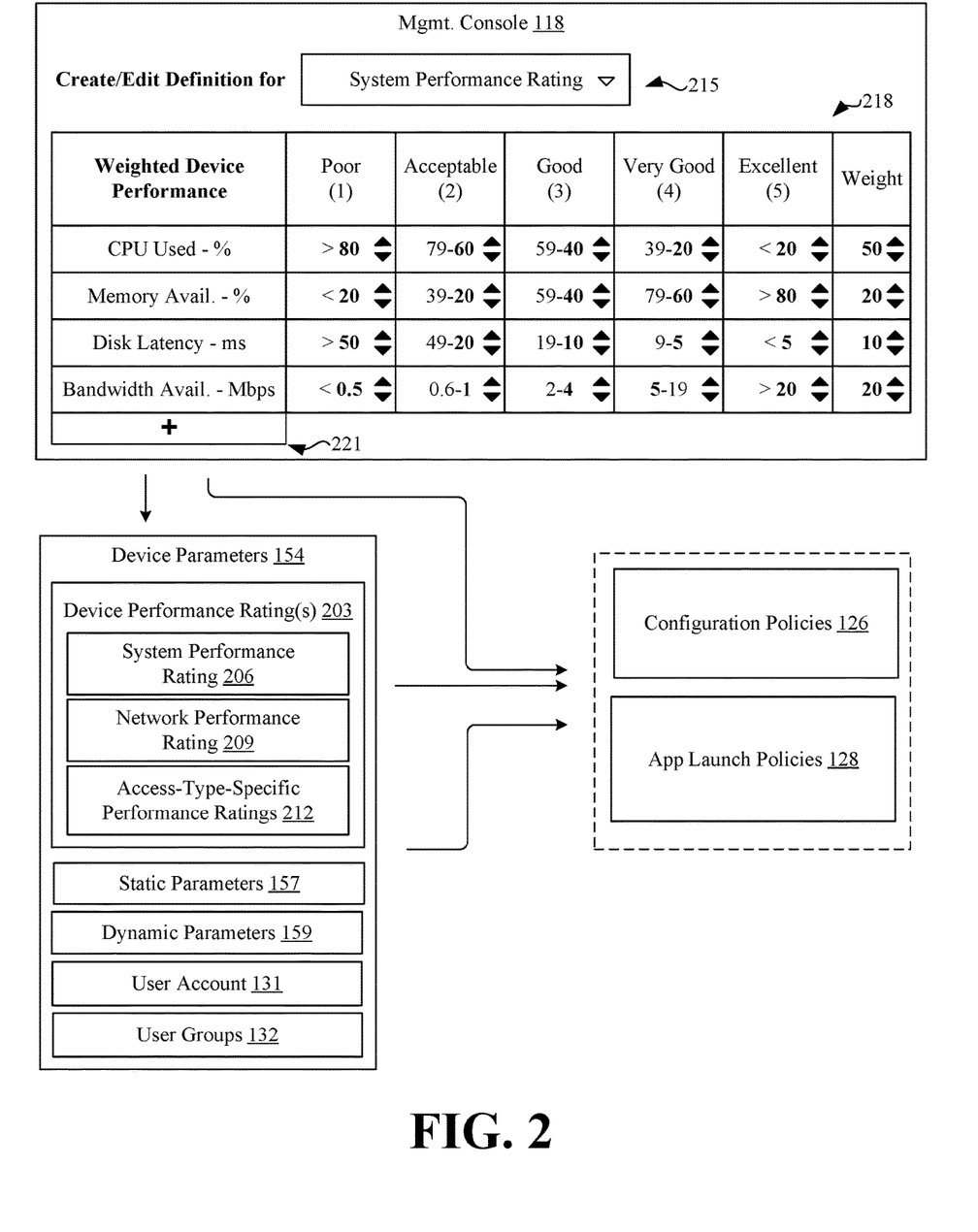
FIG. 2 is a drawing that depicts a management console that enables configuration of performance ratings and policies for intelligent launch of applications, according to the present disclosure.

FIG. 2 is a drawing that depicts a user interface of the management console 118. The management console 118 enables configuration of device performance ratings 203, configuration policies 126 and application launch policies 128 for intelligent launch of applications. The device performance ratings 203 can refer to device parameters 154 that are based on static parameters 157 and dynamic parameters 159. The device performance ratings 203 can include system performance ratings 206, network performance ratings 209, access-type-specific performance ratings 212, and others.

The device performance ratings can be determined based on device parameters 154 including static parameters 157 and dynamic parameters 159. The user account 131 and user group 132 can also be utilized. In some cases, the user account 131 and user group 132 can be associated with the client device 106 and can be considered a static parameter 157 of the device.

The management console 118 can include a user interface element 215 that when selected, updates the management console 118 to include a weighted device performance configuration tool 218. The weighted device performance configuration tool 218 can enable a user to configure customized device performance ratings 203.

The weighted device performance configuration tool 218 can include a number of user-specified device parameters 154, including static parameters 157 and dynamic parameters 159. In the example shown, dynamic parameters 159 such as percentage of CPU utilized, percentage of memory available, disk latency, and bandwidth available can be selected. As can be seen, the dynamic parameters 159 can be listed according to percentage available, percentage used, or according to total parameter value. Additional device parameters 154 can be added to the weighted device performance configuration tool 218 by selecting the user interface element 221. When selected, the user interface elements 221 can allow the user to enter, select, or otherwise specify an additional device parameters 154 that can then be partitioned into performance level threshold groups and weighted.

The weighted device performance configuration tool 218 can segregate or partition each device parameter 154 specified for a particular device performance rating 203. Here, the device parameters 154 are separated into five performance level threshold groups. User interface elements can be provided to increase or decrease a threshold range for each performance level threshold group. A weight can also be specified. This can enable the weighted device performance configuration tool 218 to generate device performance ratings 203 that combine many device parameters 154 into a combined measure or value that represents a desired metric or rating.

For example, a system performance rating 206 can be a metric that represents overall system performance. The system performance rating 206 is shown for example purposes to include the CPU used, memory available, disk latency, and bandwidth available. In other cases, fewer or additional device parameters 154 can be specified. The network performance rating 209 can be based on one or more network-specific dynamic parameters 159, such as network bandwidth, network latency, and others. Network performance rating 209 can also be based on one or more network-specific device parameters 154 such as network name, network type, network signal strength, and others. Network types can include cellular or mobile phone connection types such as 5G, 4G, LTE, 3G. Network types can also include WiFi, Bluetooth, and others. The network types can be ranked and weighted for a network performance rating 209.

Access-type-specific performance ratings 212 and/or application-specific performance ratings can also be generated. The access-type-specific performance rating 212 can, for example, be a performance rating that is specifically designed using device parameters 154 that are relevant to a particular access type. The access-type-specific performance ratings 212 can be compared in order to map the device parameters to an application access type. The configuration policies 126 can utilize or specify a set of device performance ratings 203 that the application launch agent 151 is to determine. The application launch policies 128 can be used to map the identified device parameters 154, and calculated device performance ratings 203 to a particular application access type.

Figure 3:
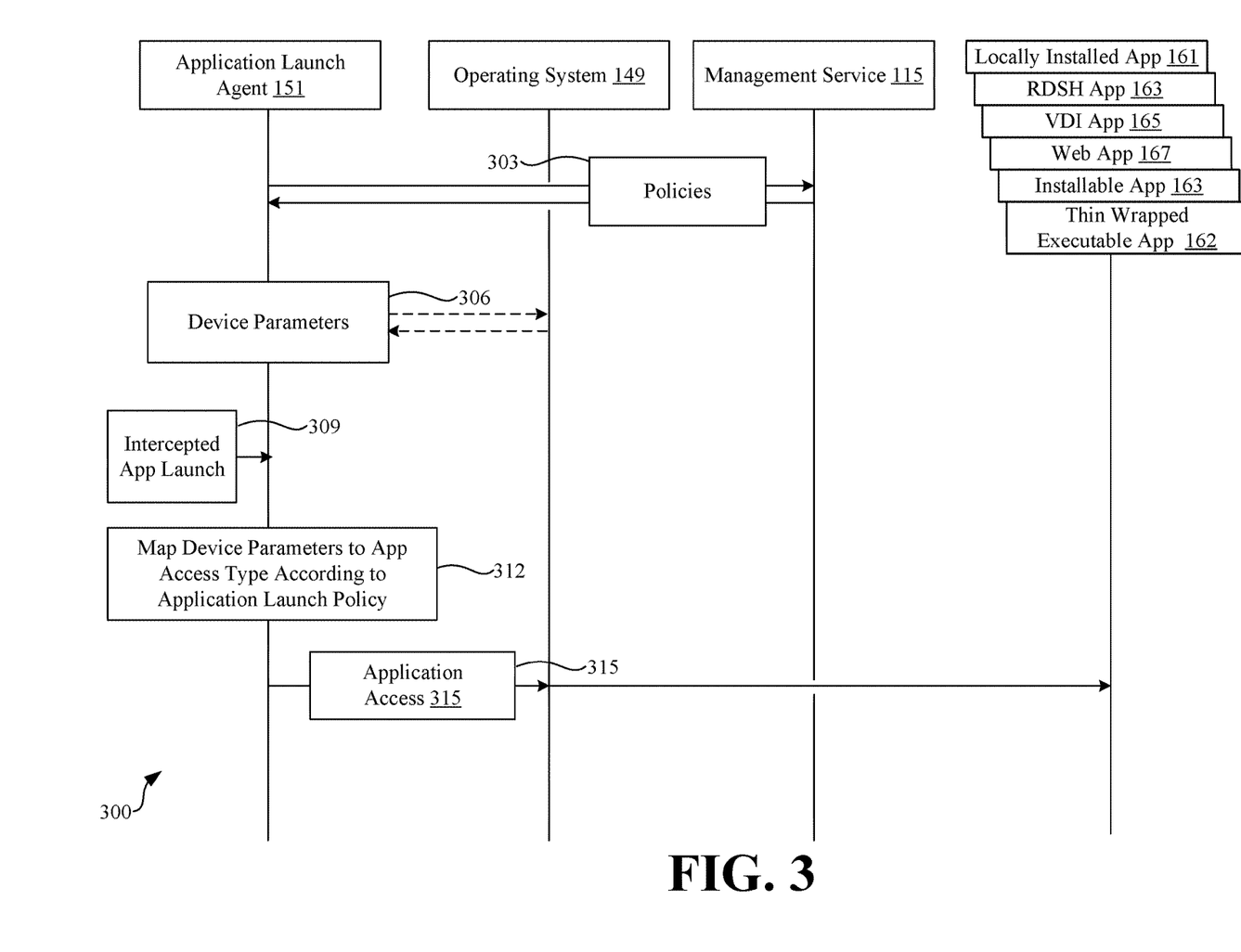
FIG. 3 is a sequence diagram depicting functionalities performed by components of the network environment of FIG. 1 for intelligent launch of applications, according to the present disclosure.

FIG. 3 shows a sequence diagram 300 depicting functionalities performed by components of the networked environment 100 for intelligent launch of applications. The sequence diagram 300 can be viewed as depicting an example of elements of methods or flowcharts implemented by various components of the networked environment 100. Generally, the sequence diagram 300 refers to how the application launch agent 151 can intercept an application launch, identify an optimal application access type at launch time, and provide the user with access to the application according to the identified access type. While the application launch agent 151 can be executed on a client device 106, the application launch agent 151 can alternatively be executed by the RDSH server 107, or the VDI server 108, which is accessed by the client device 106. Functionalities indicated with respect to the operating system 149 of the client device 106 can alternatively be performed by a server operating system of the RDSH server 107, or a client operating system of the VDI server 108.

In step 303, the policy retrieval point 173 of the application launch agent 151 can retrieve the configuration policies 126 and application launch policies 128. The policy retrieval point 173 can transmit a combined request or individual requests to the management service 115 for the configuration policies 126 and application launch policies 128. In some cases, the request can include identifiers of the policies themselves, the client device 106, a user account 131, or a user group 132. The management service 115 can identify the appropriate configuration policies 126 and application launch policies 128 and return them to the policy retrieval point 173 of the application launch agent 151.

The policy retrieval point 173 can request policies at startup of the client device 106, start of the application launch agent 151, at user login with a remote desktop provided by the RDSH server 107 or VDI server 108, and at regular intervals. The configuration policies 126 and launch policies 128 can be received and stored locally along with a timestamp so that only new and updated polices are retrieved.

In step 306, the policy information point 175 of the application launch agent 151 can detect, collect, and monitor device parameters 154 and calculate device performance ratings 203 according to a configuration policy 126. This can enable the application launch agent 151 to ultimately make application launch decisions according to application launch policies 128. The information collected can be broken down by the items described in the configuration policy 126 retrieved from the server. Information that is identified as a static parameter 157 can be identified, stored, and refreshed according to a configurable static parameter refresh rate. Dynamic parameters 159 can be collected at a configurable rate such as a specified number of seconds and averaged or trended over a specified rolling window or duration. By collecting and storing specified device parameters 154 and calculating and storing specified device performance ratings 203, these values can be retrieved at the application launch without needing any complex time-consuming calculations at launch time.

In step 309, the application launch interceptor 171 of the application launch agent 151 can intercept an application launch. This can include a user clicking on an icon that causes a system call such as file open, execute, load. Once the application launch is detected, the application launch interceptor 171 can contact the policy decision point 177 to decide which application access type should be selected.

In step 312, the policy decision point 177 of the application launch agent 151 can map device parameters 154 and device performance ratings 203 to an application access type according to the application launch policy 128. For example, the policy decision point 177 can identify the application launch policy 128 and retrieve specified device parameters 154 and device performance ratings 203 for the application that is launched. The policy decision point 177 can retrieve the device parameters 154 and device performance ratings 203 based on specified storage areas or file names for each item. The policy decision point 177 can utilize the device parameters 154, including username or user account 131, user group 132, and any of the device parameters 154 discussed as a key or input to the application launch policy 128 in order to identify an appropriate application launch type. Since the dynamic parameters 159 can change frequently, and even the static parameters 157 change periodically, this process results in a launch-time decision based on launch-time-specific device parameters 154.

The application launch type can refer to a specific way to provide the user with access to the application, such as a locally installed application 160; an already-locally-stored thin-wrapped executable application 162; an installable application 161 to download and install from a mountable application volume 110; a thin-wrapped executable application 162 to download or access from a mountable application volume 110; a web application 167 to access from a web application server 109; a VDI application 165 to access from a VDI server 108; or a RDSH application 163 to access from a RDSH server 107.

In step 315, the policy enforcement point 179 of the application launch agent 151 can implement application access instructions. Once the application access type is identified, the policy enforcement point 179 can pass appropriate information back to the operation system 149 or the appropriate remote desktop operating system to carry out application access. If the application access type identified at launch time is the same as the originally intercepted application access type, then the policy enforcement point 179 forwards the originally intercepted launch request, command, or system call to the operating system 149. Otherwise, the policy enforcement point 179 can implement application launch instructions associated with the identified application access type. The instructions can include a network or file access address associated with the specified application access type, as well as an identifier of the locally installed application 160, RDSH application 163, VDI application 165, web application 167, installable application 161, or thin-wrapped executable application 162.

Figure 4:
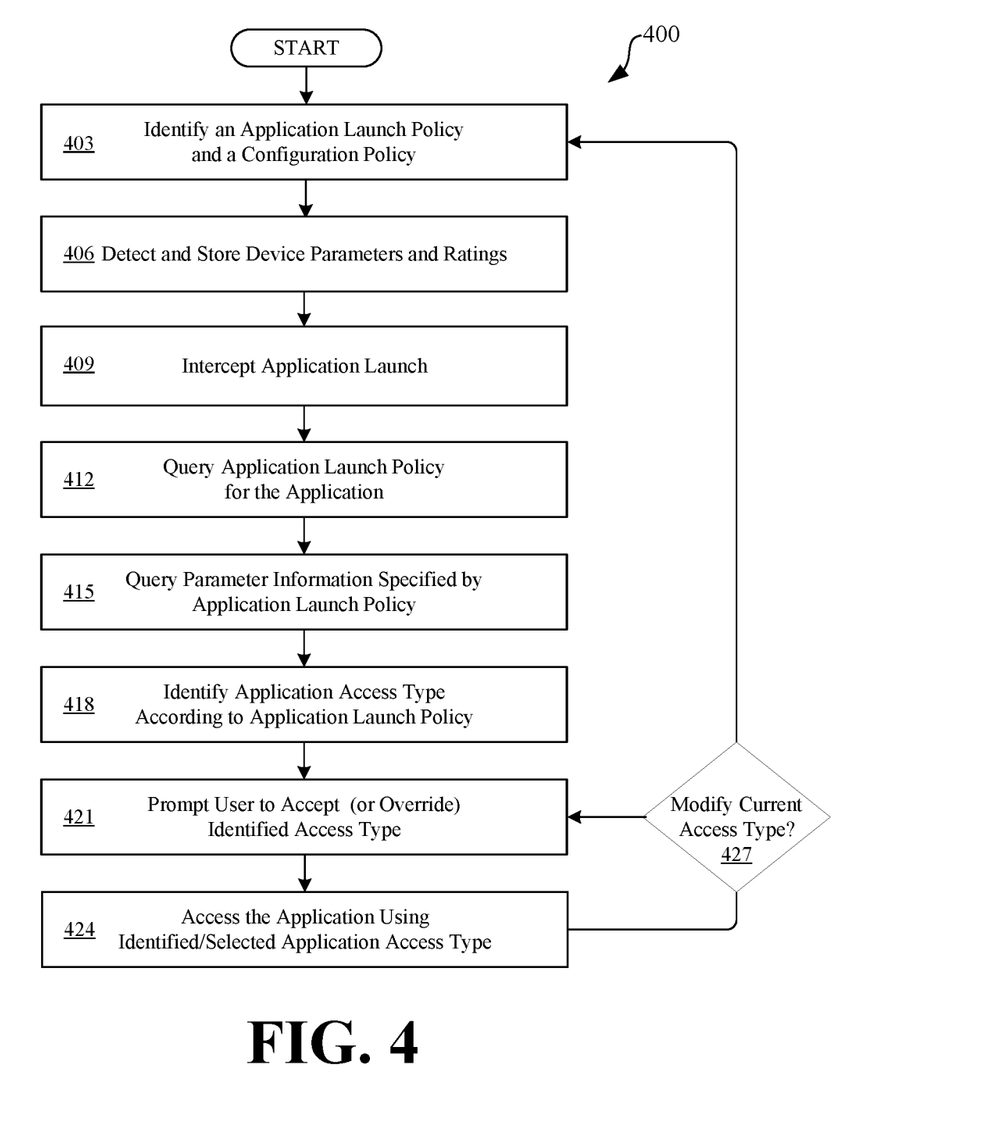
FIG. 4 is a flowchart depicting functionalities performed by components of the network environment of FIG. 1 for intelligent launch of applications, according to the present disclosure.

FIG. 4 is a flowchart 400 depicting functionalities performed by components of the networked environment 100 for intelligent launch of applications. While the flowchart 400 generally refers to how the application launch agent 151 guides launch-time-based intelligent launch of applications, aspects of the flowchart 400 are also performed by other components of the networked environment 100.

In step 403, the application launch agent 151 can identify an application launch policy 128 and a configuration policy 126. The application launch policy 128 and the configuration policy 126 can be retrieved from a management service 115, or stored on the client device 106, the RDSH server 107, the VDI server 108, or other locations.

In step 406, the application launch agent 151 can detect and store device parameters 154 and device performance ratings 203. The configuration policy 126 can include instructions to detect and store device parameters 154, as well as calculate and store certain device performance ratings 203 based on those device parameters 154. The application launch agent 151 can detect and store these items according to the configuration policy 126.

In step 409, the application launch agent 151 can intercept an application launch. For example, a user can click on an icon in a desktop environment of the operating system 149 on the local device or a desktop environment provided by the RDSH server 107 or the VDI server 108. The application launch agent 151 can include instructions to intercept system calls associated with application launch. The application launch agent 151 can identify an application name or another application identifier from the intercepted application launch. An application launch interceptor 171 component of the application launch agent 151 can perform these actions.

In step 412, the application launch agent 151 can query the application launch policy 128 using the application identifier. For example, a policy decision point 177 of the application launch agent 151 can be invoked or triggered by the application launch interceptor 171. The policy decision point 177 can query a policy retrieval point 173 or a data location where the policy retrieval point 173 stores the application launch policy 128 and configuration policy 126. The application launch policy 128 and configuration policy 126 can specify a set of device parameters 154 and device performance ratings 203 that are used by the application launch policy 128 in order to identify application access type for the specified application.

In step 415, the application launch agent 151 can query parameter information specified by the application launch policy 128 and/or the configuration policy 126. This can include querying a policy information point 175 or a data location where the policy information point 175 stores the device parameters 154, device performance ratings 203, and other parameter information.

In step 418, the application launch agent 151 can identify an application access type according to the application launch policy 128. For example, once the policy decision point 177 has obtained the device parameters 154 and device performance ratings 203, the application launch policy 128 can be evaluated to identify an application access type. Since the device parameters 154 and device performance ratings 203 are retrieved at launch time, they can be considered launch-time-specific device parameters 154 and device performance ratings 203. These launch-time-specific device parameters 154 and device performance ratings 203 can be mapped to a launch-time-specific application access type.

In step 421, the application launch agent 151 can prompt the user to accept or override the identified application access type. For example, the application launch agent 151 can generate a user interface element that includes a list of application access types. The list of list of application access types can be role-or group-specific based on a role or groups indicated by a user account 131 or a user group 132. The list of application access types can be ranked based on the application launch policy 128, for example, according to access-type-specific performance ratings 212 specified in the application launch policy 128. In some cases, the list can be color coded, shaded, indicated with a selected icon, or otherwise visually coded based on the access-type-specific performance ratings 212. The application launch agent 151 can reference threshold levels defined for access-type-specific performance ratings 212, and a color or shade of a color can be identified based on a score of each access-type-specific performance rating 212.

The user interface element can provide a textual explanation for why the identified application access type was selected. For example, the application launch agent 151 can identify, based on application launch policy 128, that the back-end server is closer to a VDI application 165, and should be selected if a network performance rating 209, or a particular device performance parameter is greater than a threshold level. The application launch agent 151 can then prompt the user to accept or override a VDI application 165 access type. A user interface can indicate that "The VDI version of this App provides better data access," along with an element that when selected accepts accessing the VDI application 165. The user interface can also include a visually coded network performance rating 209, or a visually coded device parameter 154 associated with the network performance rating 209. Visual coding thresholds can correspond to performance level threshold groups or other threshold levels.

In step 424, the application launch agent 151 can cause the client device 106 to access the application using the identified application access type. For example, the application launch agent 151 can implement application access instructions that are associated with the identified application access type. If the application access type identified at launch time is the same as the originally intercepted application access type, then the policy enforcement point 179 forwards the originally intercepted launch request, command, or system call to the operating system 149. Otherwise, the policy enforcement point 179 can implement application launch instructions associated with a version or instance of the application that corresponds to the identified application access type. The instructions can include a network or file access address associated with the specified application access type, as well as an identifier of the locally installed application 160, RDSH application 163, VDI application 165, web application 167, installable application 161, or thin-wrapped executable application 162.

In step 427, the application launch agent 151 can determine whether to modify the current application access type that is being used. For example, the application launch agent 151 can monitor updated device parameters 154 during access of the application based on the application access type, analyze the updated device parameters 154 based on an access modification threshold specified by the application launch policy 138 to identify an alternative application access type for the application, and implement application access according to the second application access type.

The application launch agent 151 can constantly or periodically determine whether to modify the application access type that is currently being used. Since modification of the current application access type during use can result in downtime, an access modification threshold should be met. The application launch policy 128 can specify the access modification threshold.

The application launch agent 151 can rank an alternative application access type highest, or over the current application access type, for a threshold period of time or a threshold number of times in a row, according to the application launch policy 128. An access-type specific performance rating 212 for another application access type can be greatest, or greater than that of the current application access type by a threshold percentage.

In one example, a user of the client device 106 can be in a vehicle or otherwise move in physical space. As a result, the network type, network signal strength, bandwidth, latency, and other network-specific device parameters 154 of the client device 106 can change. Background processes, applications and other instructions can affect CPU, memory, disk latency, and other device parameters 154. As a result, the current application access type can no longer be appropriate. These network and device factors can affect which access type is optimal. The application launch agent 151 can periodically evaluate access types according to the application launch policy 128. If the alternative application access type has been highest for a threshold period of time, the application launch agent 151 can determine that the current access type should be modified.

Since the modification process can be disruptive, if the current access type should be modified, then the process can move to step 421. In this case, the user interface can indicate the current application access type and an alternative application access type, as well as additional information for each as described above. The additional information can indicate the network-specific and other device parameters 154 of the client device 106 that have changed, as well as the modification threshold that has been exceeded. The user interface can also indicate how long it will take to modify the application access type.

If the access type modification is accepted, the application launch agent 151 can identify application states such as a file that is being accessed and other application states. The application states can be stored. The application launch agent 151 can launch the alternative application access type to maintain the application states, and terminate the current application access type.

The client devices 106 and the devices comprising the computing environment 103 and a third-party system can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be applications and other executable instructions. Also, stored in the memory can be a data store and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as, object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display upon which a user interface generated by the management console 118, the application launch agent 151, or another application can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the management service 115, management console 118, the application launch agent 151, the third-party service, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram of FIG. 2 shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram of FIG. 2 shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semi-conductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
    at least one computing device comprising at least one processor and at least one memory; and
    machine-readable instructions stored in the at least one memory, wherein the instructions, when executed by the at least one processor, cause the at least one computing device to at least:
       intercept, by a launch agent that facilitates just-in-time application delivery decisions between a plurality of application access types for a requested application at launch time, a launch request for the requested application that is requested from a client device;
       identify an application launch policy that causes the launch agent to detect at least one device parameter and calculate a plurality of access-type-specific performance ratings corresponding to the plurality of application access types, wherein the plurality of access-type-specific performance ratings are calculated using the at least one device parameter;

retrieve, by the launch agent at the launch time, the plurality of access-type-specific performance ratings specified by the application launch policy;

map, by the launch agent at the launch time, an application access type from the plurality of application access types according to the application launch policy and based at least in part on the plurality of access-type-specific performance ratings, wherein the plurality of application access types refer to different ways to deliver the requested application; and launch and access the requested application using the application access type that is identified by the launch agent at the launch time.

2. The system of claim 1, wherein the instructions, when executed by the at least one processor, cause the at least one computing device to at least:

receive the application launch policy from a management service.

3. The system of claim 1, wherein the application launch is intercepted using an application launch agent installed on: the client device, a RDSH desktop server, or a VDI desktop server.

4. The system of claim 1, wherein the application access types indicated in the application launch policy comprise:

a local instance of the requested application installed on the client device, a remote desktop session host (RDSH) instance of the requested application installed on a RDSH desktop server, a virtual desktop infrastructure (VDI) instance of the requested application installed on a VDI desktop server, a web application instance of the requested application installed on a web application, and a thin-wrapped executable of the requested application on a mountable volume, and application access rules cause the launch agent to select the application access type from a group comprising the local instance, the RDSH instance, the VDI instance, and the thin-wrapped executable based on the at least one device parameter.

5. The system of claim 1, wherein the instructions, when executed by the at least one processor, cause the at least one computing device to at least:

generate a user interface that includes a list of application access types and a user interface element that enables a user confirmation of the application access type, wherein the user confirmation is detected based on an activation of the user interface element.

6. The system of claim 1, wherein the instructions, when executed by the at least one processor, cause the at least one computing device to at least:

monitor updated device parameters during access of the requested application based on the application access type, wherein the application access type is a first application access type;

analyze the updated device parameters based on an access modification threshold specified by the application launch policy to identify a second application access type for the requested application; and access the requested application based on the second application access type.

7. The system of claim 1, wherein the plurality of application access types are provided using a plurality of separately stored instances that are delivered in different ways.

8. A non-transitory computer-readable medium comprising machine-readable instructions, wherein the instructions, when executed by at least one processor, cause at least one computing device to at least:

intercept, by a launch agent that facilitates just-in-time application delivery decisions between a plurality of application access types for a requested application at launch time, a launch request for the requested application that is requested from a client device;

identify an application launch policy that causes the launch agent to detect at least one device parameter and calculate a plurality of access-type-specific performance ratings corresponding to the plurality of application access types, wherein the plurality of access-type-specific performance ratings are calculated using the at least one device parameter;

retrieve, by the launch agent at the launch time, the plurality of access-type-specific performance ratings specified by the application launch policy;

map, by the launch agent at the launch time, an application access type from the plurality of application access types according to the application launch policy and based at least in part on the plurality of access-type-specific performance ratings, wherein the plurality of application access types refer to different ways to deliver the requested application; and launch and access the requested application using the application access type that is identified by the launch agent at the launch time.

9. The non-transitory computer-readable medium of claim 8, wherein the instructions, when executed by the at least one processor, cause the at least one computing device to at least:

receive the application launch policy from a management service.

10. The non-transitory computer-readable medium of claim 8, wherein the application launch is intercepted using an application launch agent installed on: the client device, a RDSH desktop server, or a VDI desktop server.

11. The non-transitory computer-readable medium of claim 8, wherein the requested application is accessed based on:

a local instance of the requested application installed on the client device, a remote desktop session host (RDSH) instance of the requested application installed on a RDSH desktop server, a virtual desktop infrastructure (VDI) instance of the requested application installed on a VDI desktop server, a web application instance of the requested application installed on a web application, or a thin-wrapped executable application on a mountable volume.

12. The non-transitory computer-readable medium of claim 8, wherein the instructions, when executed by the at least one processor, cause the at least one computing device to at least:

generate a user interface that includes a list of application access types and a user interface element that enables a user confirmation of the application access type, wherein the user confirmation is detected based on an activation of the user interface element.

13. The non-transitory computer-readable medium of claim 8, wherein the instructions, when executed by the at least one processor, cause the at least one computing device to at least:

monitor updated device parameters during access of the requested application based on the application access type, wherein the application access type is a first application access type;

analyze the updated device parameters based on an access modification threshold specified by the application launch policy to identify a second application access type for the requested application; and access the requested application based on the second application access type.

14. The non-transitory computer-readable medium of claim 12, wherein the at least one device parameter comprises a device performance rating comprising a combined measure of a plurality of weighted hardware usage parameters.

15. A method performed by instructions executed by at least one processor of at least one computing device, the method comprising:

intercepting, by a launch agent that facilitates just-in-time application delivery decisions between a plurality of application access types for a requested application at launch time, a launch request for the requested application that is requested from a client device;

identifying an application launch policy that causes the launch agent to detect at least one device parameter and calculate a plurality of access-type-specific performance ratings corresponding to the plurality of application access types, wherein the plurality of access-type-specific performance ratings are calculated using the at least one device parameter;

retrieving, by the launch agent at the launch time, the plurality of access-type-specific performance ratings specified by the application launch policy;

mapping, by the launch agent at the launch time, an application access type from the plurality of application access types according to the application launch policy and based at least in part on the plurality of access-type-specific performance ratings, wherein the plurality of application access types refer to different ways to deliver the requested application; and launching and accessing the requested application using the application access type that is identified by the launch agent at the launch time.

16. The method of claim 15, wherein the application launch is intercepted using an application launch agent installed on: the client device, a RDSH desktop server, or a VDI desktop server.

17. The method of claim 15, wherein the requested application is accessed based on:

a local instance of the requested application installed on the client device, a remote desktop session host (RDSH) instance of the requested application installed on a RDSH desktop server, a virtual desktop infrastructure (VDI) instance of the requested application installed on a VDI desktop server, a web application instance of the requested application installed on a web application, or a thin-wrapped executable application on a mountable volume.

18. The method of claim 15, further comprising:

identifying at least one static parameter of the client device, wherein the at least one static parameter is not subject to change based on usage of the client device and usage of a network environment of the client device;

periodically detecting at least one dynamic parameter, wherein the at least one dynamic parameter changes based on usage of the client device and usage of the network environment of the client device.

19. The method of claim 17, further comprising:

generating a user interface that includes a list of application access types and a user interface element that enables a user confirmation of the application access type, wherein the user confirmation is detected based on an activation of the user interface element.

20. The method of claim 15, further comprising:

monitoring updated device parameters during access of the requested application based on the application access type, wherein the application access type is a first application access type;

analyzing the updated device parameters based on an access modification threshold specified by the application launch policy to identify a second application access type for the requested application; and accessing the requested application based on the second application access type.

\* \* \* \* \*